(12) United States Patent
Tsai

(10) Patent No.: US 7,410,330 B1
(45) Date of Patent: Aug. 12, 2008

(54) CUTTER ASSEMBLY

(76) Inventor: Shi-Ling Tsai, 2F., No. 115, Wu Kung 3rd Rd., Wu Ku Industrial Dist., Taipei Hsien (TW)

(*) Notice: Subject to any disclaimer, the term of this patent is extended or adjusted under 35 U.S.C. 154(b) by 0 days.

(21) Appl. No.: 11/747,926

(22) Filed: May 14, 2007

(51) Int. Cl.
*B23C 1/09* (2006.01)
*B23C 5/09* (2006.01)

(52) U.S. Cl. .................. 407/35; 407/29.13; 407/43; 407/51; 407/56

(58) Field of Classification Search ............ 407/29.1, 407/29.13, 35, 43, 51, 56; 144/118; 83/698.41, 83/508.3
See application file for complete search history.

(56) References Cited

U.S. PATENT DOCUMENTS

| | | | | |
|---|---|---|---|---|
| 2,592,382 A | * | 4/1952 | Blais | 407/31 |
| 4,522,538 A | * | 6/1985 | Lindsay | 407/35 |
| 6,012,372 A | * | 1/2000 | Laster et al. | 83/665 |
| 6,899,493 B1 | * | 5/2005 | Russell | 407/35 |
| 7,153,068 B2 | * | 12/2006 | Satran et al. | 407/66 |

* cited by examiner

*Primary Examiner*—Willmon Fridie
(74) *Attorney, Agent, or Firm*—Leong C. Lei

(57) ABSTRACT

The cutter assembly contains an axle having a number of parallel, equally spaced troughs along the axial direction, and a number of circular blade discs, each having a center hole threaded through by the axle. Each blade disc has a number of teeth along the circumference of the center hole corresponding and matching to the troughs of the axle. The blade disc has fewer blades than the teeth and the blade discs therefore can be mounted on the axle in different orientations so that their blades are spirally arranged. The axle of the cutter assembly has a fixed end and the blade discs can be sequentially installed to or removed from the other free end. The bearing at the free end has a smaller diameter so that the blade discs can be removed or installed directly passing through the bearing without removing it first.

3 Claims, 5 Drawing Sheets

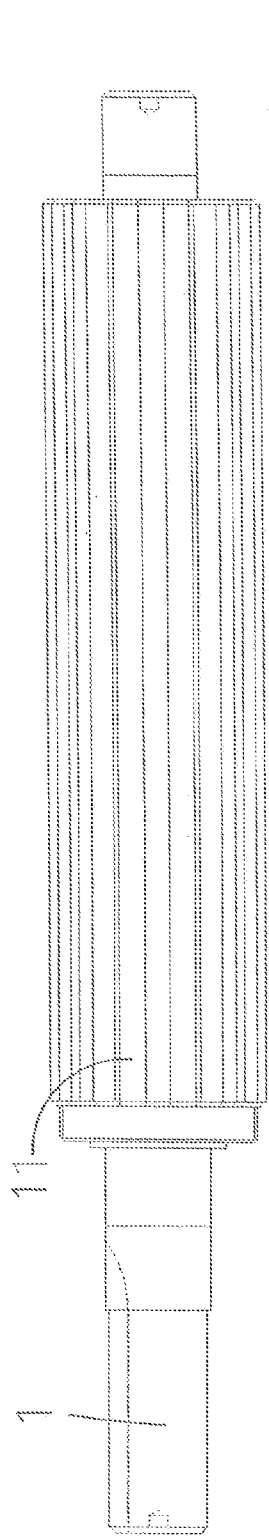
FIG. 2
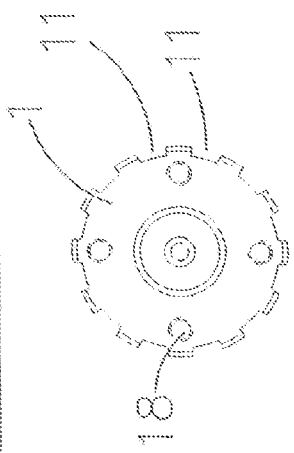
FIG. 4
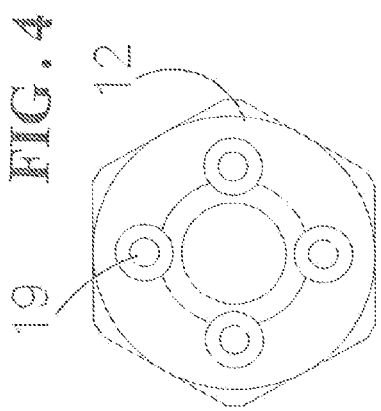
FIG. 5
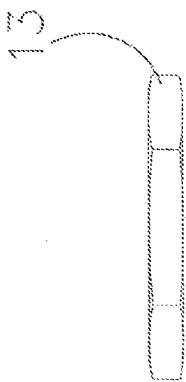
FIG. 6
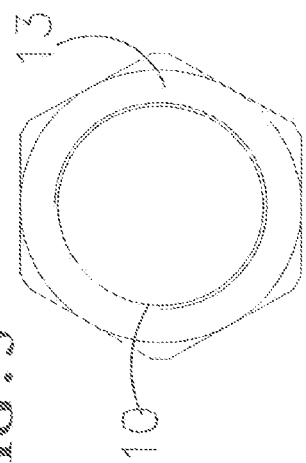
FIG. 7
FIG. 3

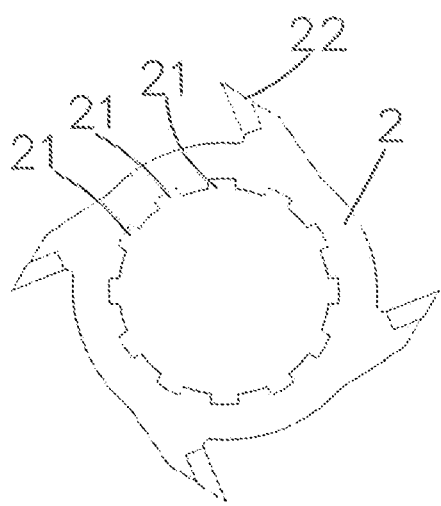
FIG. 8
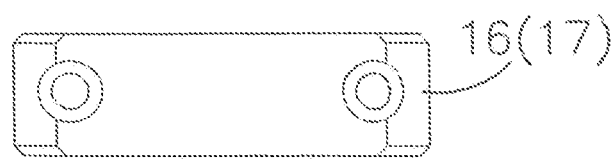
FIG. 11
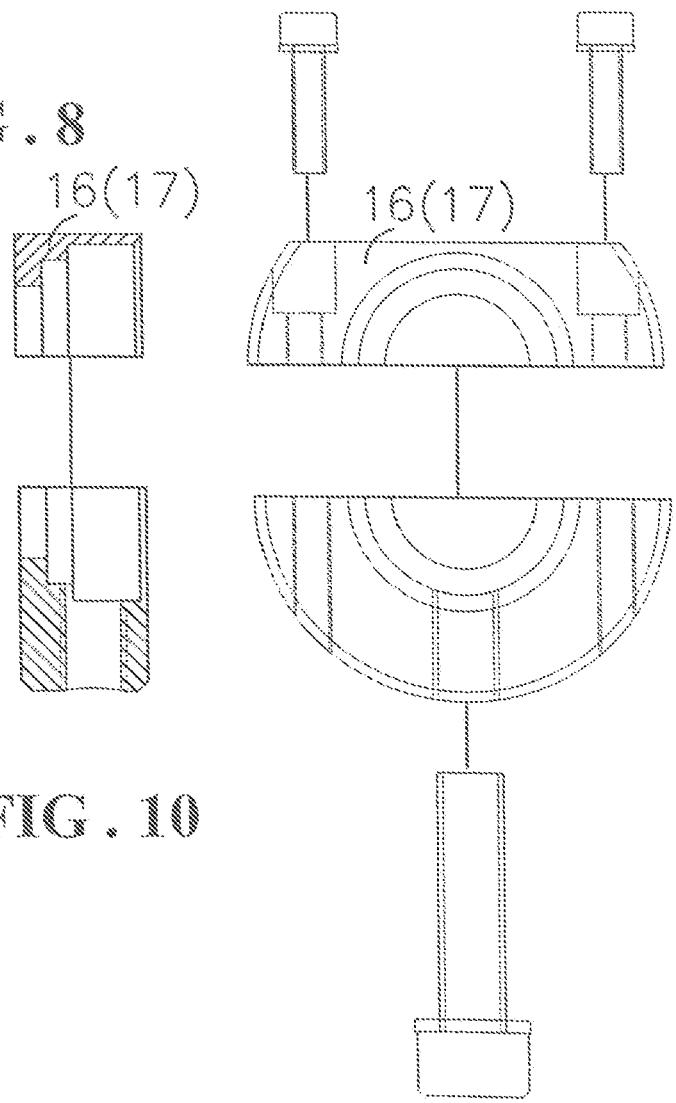
FIG. 10
FIG. 9

CUTTER ASSEMBLY

(A) TECHNICAL FIELD OF THE INVENTION

The present invention generally relates to cutter assemblies for wood planing and cutting, and more particularly to a cutter assembly having easily replaceable blade discs.

(B) DESCRIPTION OF THE PRIOR ART

A number of cutter assemblies whose blades are spirally arranged have already been taught in the prior art. These spiral cutter assemblies usually contain a number of blade discs threaded by an axle through their centers. The advantage of these spiral cutter assemblies is that, if one blade disc is damaged, only that blade disc needs replacement, instead of the entire cutter assembly.

Usually these cutter assemblies are supported at the axle's two ends by bearings and bearing sets so that the axle and therefore the spirally arranged blades can freely spin. Within the pair of bearings, the blade discs are usually sandwiched and confined between two nuts at the two ends of the axle. To replace a damaged blade disc, therefore, requires the dismantling of the bearings and the bearings seats, and the untying of the nuts. Then, the blade discs can be removed sequentially from the axle. To install the blade discs on the axle has to follow similar but reversed procedure. The extraneous steps of removing the bearings, bearings seats, and the nuts inevitably affect the production speed.

In addition, the blade discs usually have a tooth on the circumference of the center hole so as to match a trough configured along the axial direction on the axle. In other words, these blade discs can have only one orientation when they are mounted on the axle. In order to have the blades arranged spirally, there are different types of blade discs where the positions of their blades are different. This will make the maintenance of the cutter assembly more inconvenient and costly as, when one blade disc is damaged, it has to be replaced by one of the same type as the damaged one.

SUMMARY OF THE INVENTION

Accordingly, an objective of the present invention is to provide a cutter assembly whose blade discs can be installed and removed more conveniently than the prior arts.

Another objective of the present invention is to provide a cutter assembly where there is a single type of blade discs yet the spiral arrangement of the blades can still be achieved.

To fulfill the foregoing objectives, the cutter assembly contains an axle having a number of parallel, equally spaced troughs along the axial direction. The cutter assembly further contains a number of blade discs, each having a center hole threaded through by the axle. Each blade disc has a number of teeth along the circumference of the center hole corresponding and matching to the troughs of the axle. The blade disc has fewer blades than the teeth and, therefore, the blade discs can be mounted on the axle in different orientations so that their blades are spirally arranged.

On the other hand, the axle of the cutter assembly has a fixed end and the blade discs can be installed to or removed from the other free end. The bearing at the free end has a smaller diameter so that the blade discs can be removed or installed directly passing through the bearing without removing it first.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2 is a schematic diagram showing the axle of the cutter assembly of FIG. 1 viewed from a side.

FIG. 3 is a schematic diagram showing the axle of FIG. 2 viewed towards a second end of the axle.

FIG. 4 is a schematic diagram showing the axle of FIG. 2 viewed towards a first end of the axle.

FIG. 5 is a schematic diagram showing a ring of the cutter assembly of FIG. 1 viewed towards the front.

FIG. 6 is a schematic diagram showing a nut of the cutter assembly of FIG. 1 viewed towards the top.

FIG. 7 is a schematic diagram showing a nut of the cutter assembly of FIG. 1 viewed towards the front.

FIG. 8 is a schematic diagram showing a blade disc of the cutter assembly of FIG. 1 viewed towards the front.

FIG. 9 is a schematic diagram showing a bearing seat of the cutter assembly of FIG. 1 viewed towards the front.

FIG. 10 is a schematic diagram showing a bearing seat of the cutter assembly of FIG. 1 viewed towards a side.

FIG. 11 is a schematic diagram showing a bearing seat of the cutter assembly of FIG. 1 viewed towards the top.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
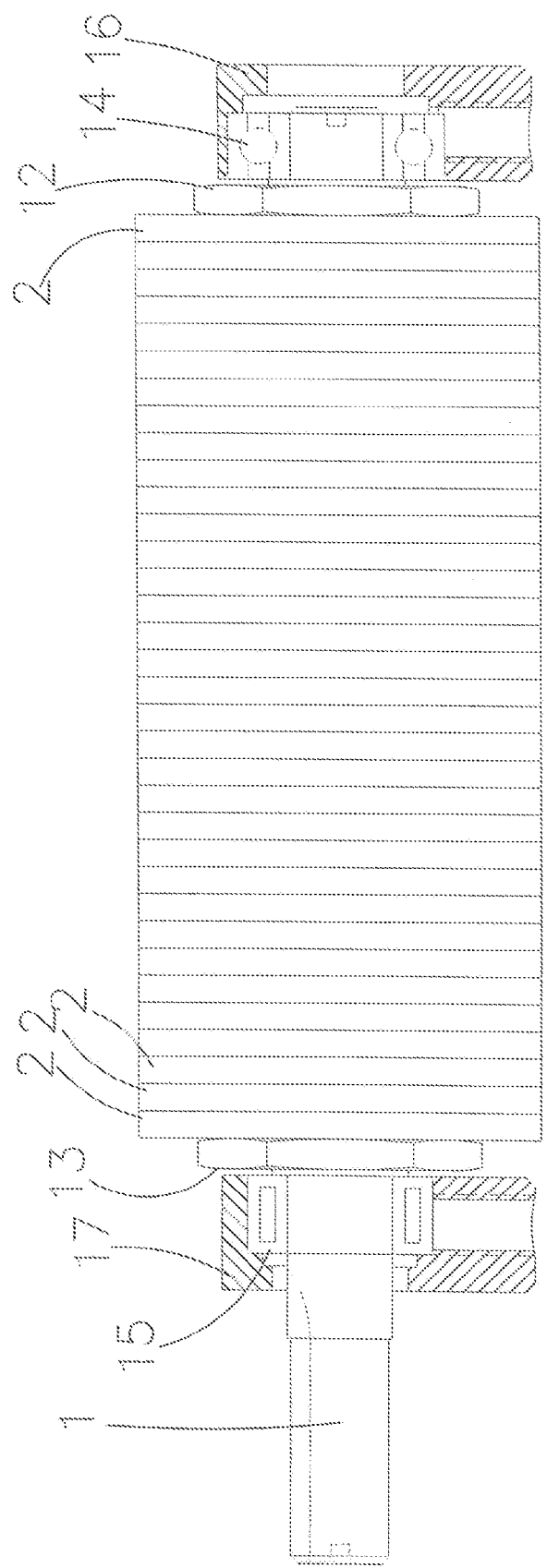
FIG. 1 is a schematic diagram showing a cutter assembly viewed from a side according to an embodiment of the present invention.

As shown in FIG. 1, a cutter assembly according to an embodiment of the present invention contains an axle 1. As further shown in FIGS. 2 and 3, the axle 1 has a number of parallel, equally spaced troughs 11 along the axial direction. The cutter assembly further contains a number of circular blade discs 2, each having a center hole (not numbered) threaded through by the axle 1. As shown in FIG. 8, each blade 2 has a number of teeth 21 along the circumference of the center hole corresponding and matching to the troughs 11 of the axle 1.

As shown in FIG. 1, a hexagonal ring 12 is mounted to a first end of the axle 1. The ring 12 can have other appropriate shapes and the hexagonal ring 12 is used here as it can be easily mounted by using a wrench. As shown in FIG. 4, the first end of the axle 1 has a number of equally spaced bolt holes 18 configured on the end surface perpendicular to the axle 1. Correspondly, the ring 12 has a number of equally spaced bolt holes 19, as shown in FIG. 5, so that the ring 12 is fixed joined to the first end of the axle 1 by running a number of bolts (not shown) through the aligned bolt holes 18 and 19.

As shown in FIGS. 1, 6, and 7, a hexagonal (or other appropriate shaped) nut 13 is screwed to a second end of the axle 1 so that the blade discs 2 are reliably sandwiched between the nut 13 and the ring 12. After the nut 13 is unscrewed and removed, the blade discs 2 can be removed sequentially from the axle 1.

As shown in FIG. 1, two bearings 14 and 15 are mounted to the first and second ends of the axle 1, respectively, sandwiching the blade discs 2, the ring 12, and the nut 13 therebetween. The two bearings 14 and 15 are then surrounded by two bearing seats 16 and 17, respectively.

As shown in FIG. 10, each of the bearing seats 16 and 17 is separated into a top half and a bottom half (both not numbered). As shown in FIG. 9, the two halves are joined together by a pair of screws (also not numbered) running vertically downward through the two halves. The bottom half is further fixedly positioned on a platform (not shown in the drawings) by another screw (not numbered) running vertically upward through the bottom half and the platform. FIG. 11 shows the bearing seat 16 or 17 in a top view. Therefore, by removing the top halves of the bearing seats 16 and 17, the axles 1 together with the blade discs 2, the ring 12, and the nut 13, can be removed altogether from the bottom halves of the bearing seats 16 and 17 for the replacement of the blade discs 2.

Figure 12:
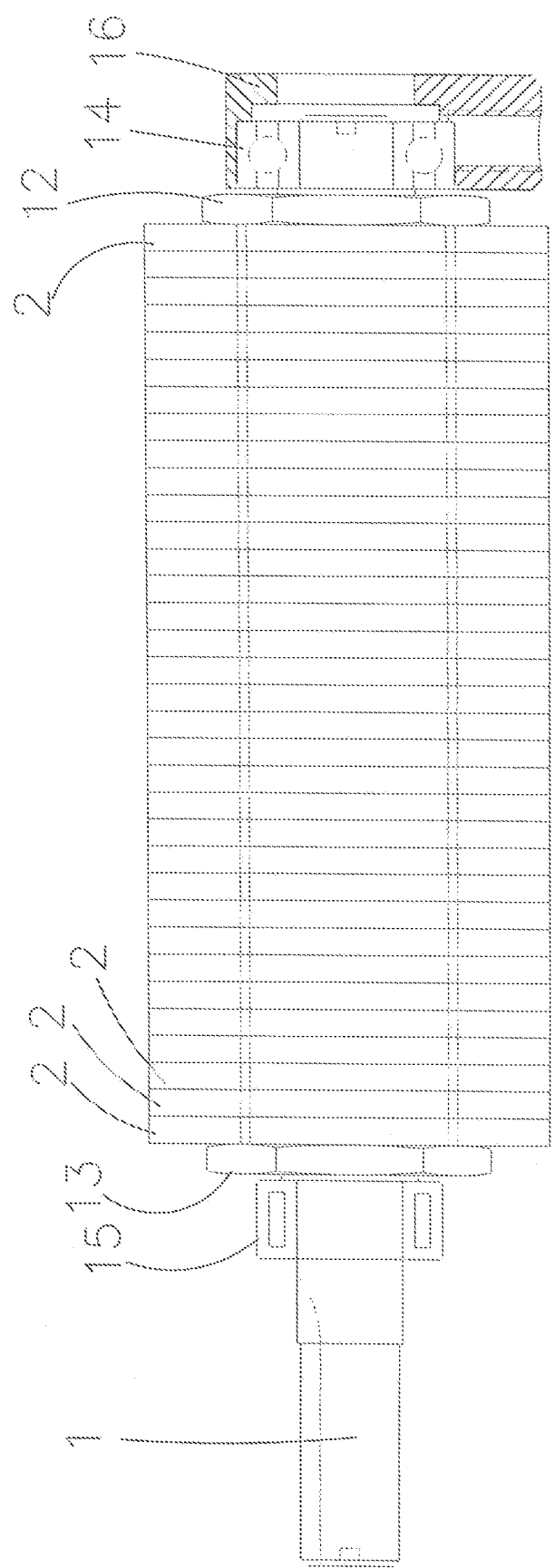
FIG. 12 is a schematic diagram showing the cutter assembly of FIG. 1 with the bearing seat at the second end of the axle removed.
Figure 13:
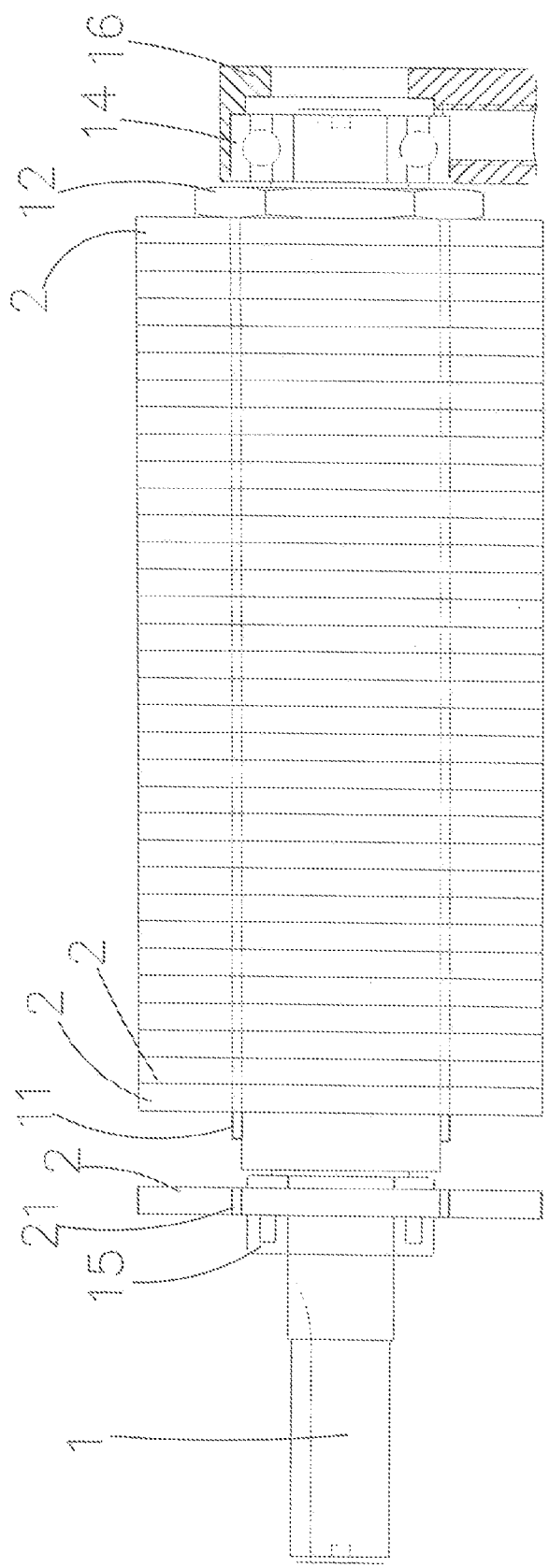
FIG. 13 is a schematic diagram showing the cutter assembly of FIG. 1 when a blade disc is removed.

Please note that the hole of the nut 13 has a larger diameter than that of the bearing 15. The center hole of each blade disc 2 also has a larger diameter than that of the bearing 15. As such, after dismantling the bearing seat 17 as shown in FIG. 12, the nut 13 can be unscrewed and removed from the axle 1 by a wrench without removing the bearing 15, as shown in FIG. 13. Then, the blade discs 2 can also be removed, leaving the bearing 15 at its place. This is a major characteristic of the present invention.

As shown in FIG. 8, when the blade disc 2 has fewer blades 22 than the teeth 21, the blade discs 2 can be mounted on the axle 1 so that their blades 22 are spirally arranged. For example, in the present embodiment, each blade disc 2 has four blades 22 and twelve teeth 21. This means that each blade disc 2 can be mounted on the axle 1 to show three different types of blade orientations. This is another major characteristic of the present invention.

A brief summary of the present invention is as follows. In the present invention, the axle of the cutter assembly has a fixed end and the blade discs can be installed to or removed from the other free end sequentially. The bearing at the free end has a smaller diameter so that the blade discs can be removed without taking down the bearing.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A cutter assembly, comprising:
    an axle having a plurality of parallel troughs along the axial direction;
    a plurality of blade discs, each having a plurality of blades along the rim, a center hole threaded through by said axle, and a plurality of teeth along the circumference of said center hole matching said troughs of said axle;
    a ring fixedly mounted to a first end of said axle;
    a nut removably mounted to a second end of said axle, said nut and said ring sandwiching said blade discs therebetween;
    a pair of bearing mounted to said first and second ends of said axle, respectively, sandwiching said blade discs, said ring, and said nut therebetween; and
    a pair of bearing seats surrounding said bearings;
    wherein the diameter of said center holes of said blade discs is larger than the diameter of said bearings; and the diameter of the hole of said nut is larger than the diameter of said bearings.

2. The cutter assembly according to claim 1, wherein the number of said blades is smaller than the number of said teeth of a blade disc.

3. The cutter assembly according to claim 1, wherein a bearing seat comprises a top half and a bottom half; said bottom half is fixedly positioned; and said top half is removably joined to said bottom half to surround a bearing.

* * * * *